(12) United States Patent
Chiussi et al.

(10) Patent No.: US 7,075,934 B2
(45) Date of Patent: Jul. 11, 2006

(54) METHOD AND APPARATUS FOR HIERARCHICAL BANDWIDTH DISTRIBUTION IN A PACKET NETWORK

(75) Inventors: Fabio M. Chiussi, Long Branch, NJ (US); Robert T. Clancy, Guilford, CT (US); Kevin D. Drucker, Annandale, NJ (US); Andrea Francini, Middletown, NJ (US); Nasser E. Idirene, Eatontown, NJ (US)

(73) Assignee: Lucent Technologies Inc., Murray Hill, NJ (US)

( * ) Notice: Subject to any disclaimer, the term of this patent is extended or adjusted under 35 U.S.C. 154(b) by 612 days.

(21) Appl. No.: 10/008,425

(22) Filed: Nov. 13, 2001

(65) Prior Publication Data

US 2003/0169743 A1    Sep. 11, 2003

Related U.S. Application Data

(60) Provisional application No. 60/260,807, filed on Jan. 10, 2001.

(51) Int. Cl.
*H04L 12/56* (2006.01)
(52) U.S. Cl. .................... 370/395.41; 370/418
(58) Field of Classification Search .......... 370/395.41, 370/395.42, 395.43, 230.1, 416, 418
See application file for complete search history.

(56) References Cited

U.S. PATENT DOCUMENTS

| | | | |
|---|---|---|---|
| 6,018,527 A * | 1/2000 | Yin et al. | 370/395.41 |
| 6,272,109 B1 * | 8/2001 | Pei et al. | 370/230 |
| 6,396,834 B1 * | 5/2002 | Bonomi et al. | 370/394 |
| 6,438,134 B1 * | 8/2002 | Chow et al. | 370/412 |
| 6,470,016 B1 * | 10/2002 | Kalkunte et al. | 370/395.41 |
| 6,775,231 B1 * | 8/2004 | Baker et al. | 370/230.1 |
| 6,810,012 B1 * | 10/2004 | Yin et al. | 370/230.1 |
| 6,940,861 B1 * | 9/2005 | Liu et al. | 370/395.21 |

\* cited by examiner

*Primary Examiner*—Hassan Kizou
*Assistant Examiner*—Brian Roberts

(57) ABSTRACT

A scheduler apparatus provides bandwidth guarantees to individual data packet flows as well as to aggregations of those flows (referred to as "bundles") in a completely transparent manner, i.e., without using any additional scheduling structure. For each bundle, the scheduler determines the ratio between the bandwidth nominally allocated to the bundle and the sum of the individual bandwidth allocations of the flows that are currently backlogged in the bundle. The scheduler uses that ratio to modulate the timestamp increments that regulate the distribution of bandwidth to the individual flows. In this manner, the greater the ratio for that bundle, the more the bandwidth that each backlogged flow in the bundle receives.

16 Claims, 12 Drawing Sheets

FIG. 3A

```
1    if (flow i is newly backlogged)
2        $F_i^k \leftarrow \frac{l_i^k}{\rho_i}$
3        Append i to the tail of the linked list
4    else  /* A packet of i has just been transmitted */
5        $F_i^k \leftarrow F_i^{k-1} + \frac{l_i^k}{\rho_i}$
6        if $(F_i^k \geq T_Q)$
7            $F_i^k \leftarrow F_i^k - T_Q$
8            Conclude visit to flow i
9        else
10           Keep servicing flow i
```

FIG. 3B

```
1    $F_i^k \leftarrow F_i^{k-1} + \frac{l_i^k}{\rho_i}$
2    if $(F_i^k \geq T_Q)$
3        $F_i^k \leftarrow F_i^k - T_Q$
4        Conclude visit to flow i
5    else if (flow i is still backlogged)
6        Keep servicing flow i
```

FIG. 7
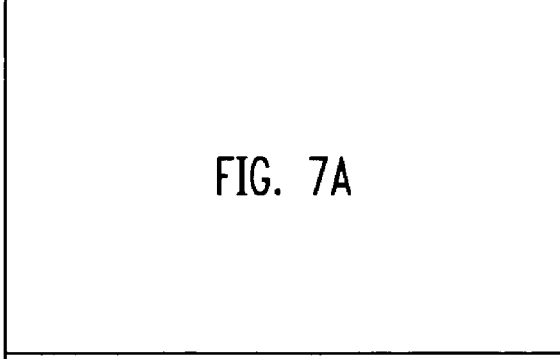
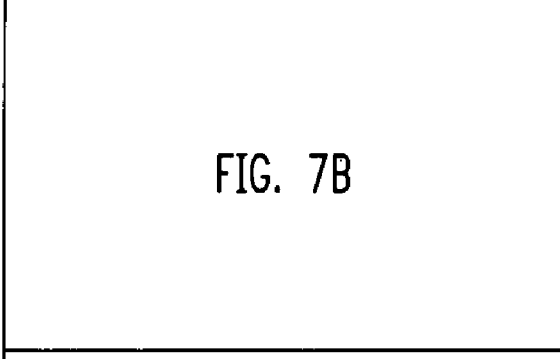
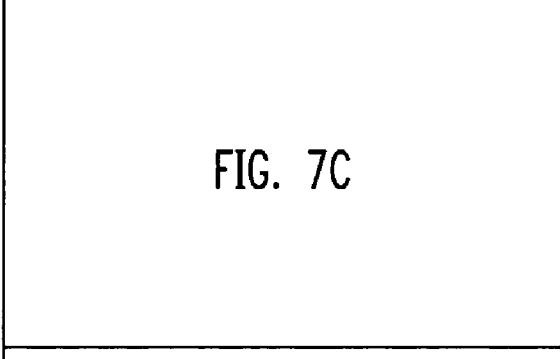
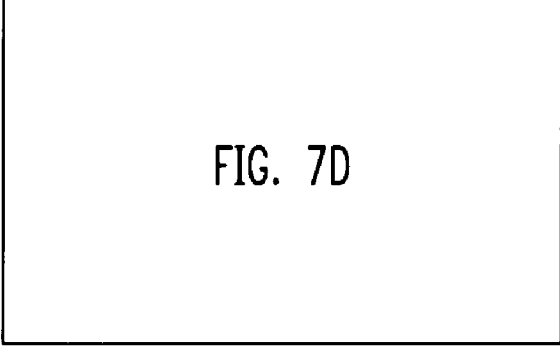

FIG. 8

1. Identify flow $i$ currently at the head of the linked list
2. Identify bundle $I$ of flow $i$
3. if $(FF_i \neq FRMCNT)$
4.     $FRMCNT \leftarrow \neg FRMCNT$
5. Prepare head-of-the-queue packet $p_i^k$ for transmission
6. if $(\sigma_I \neq FRMCNT)$
7.     $\Phi_I \leftarrow \phi_I$
8.     $\sigma_I \leftarrow FRMCNT$
9. $F_i^k \leftarrow F_i^{k-1} + \dfrac{l_i^k}{R_I} \cdot \dfrac{\Phi_I}{\rho_i}$
10. if $(F_i^k \geq T_Q)$ /* Frame over for flow $i$ */
11.     $F_i^k \leftarrow F_i^k - T_Q$
12.     $FF_i \leftarrow \neg FRMCNT$
13.     Extract flow $i$ from head of linked list
14.     if (Flow $i$ is still backlogged)
15.         Append flow $i$ to tail of linked list
16.     else /* Flow $i$ is getting idle */
17.         $\phi_I \leftarrow \phi_I - \rho_i$
18. else if (Flow $i$ is getting idle)
19.     Extract flow $i$ from head of linked list
20.     $\phi_I \leftarrow \phi_I - \rho_i$

US 7,075,934 B2

METHOD AND APPARATUS FOR HIERARCHICAL BANDWIDTH DISTRIBUTION IN A PACKET NETWORK

RELATED APPLICATION

This application is based on a provisional application Ser. No. 60/260,807, filed on Jan. 10, 2001, and entitled "Method and Apparatus for Hierarchical Bandwidth Distribution in a Packet Network."

TECHNICAL FIELD OF THE INVENTION

This invention relates to packet schedulers, and more particularly to a packet-scheduling apparatus and method for guaranteeing data transfer rates to individual data sources and to aggregations of those data sources.

BACKGROUND OF THE INVENTION

The increasing popularity of elaborate Quality-of-Service (QoS) frameworks such as Integrated Services [see reference 1 listed in the attached Appendix] and Differentiated Services [2] puts emphasis on packet schedulers that allow flexible bandwidth management. Several existing packet schedulers offer excellent worst-case delay performance in addition to providing accurate bandwidth guarantees [3, 4, 5, 6, 7, 8], but their cost is substantial [6, 7, 8]. In IP networks, the enforcement of tight delay guarantees is still rather secondary to the low-cost provision of robust bandwidth guarantees. For this reason, the industry is showing considerable interest in Weighted Round Robin (WRR) schedulers [9, 10, 11], which do not necessarily achieve tight delay bounds, but do provide robust bandwidth guarantees with minimal complexity. Different instances of these schedulers have appeared in literature; well-known examples are the Deficit Round Robin (DRR) algorithm [10] and the Surplus Round Robin (SRR) algorithm [11].

The aforementioned instances of WRR schedulers successfully differentiate the bandwidth guarantees of heterogeneous data packet flows. However, with respect to the form in which they are currently defined, they are not sufficient to satisfy all the bandwidth requirements of emerging Quality-of-Service frameworks. Typically, flexible bandwidth management at the network nodes requires the deployment of hierarchical scheduling structures, where bandwidth can be allocated not only to individual flows, but also to aggregations of those flows. With existing WRR schedulers, the superimposition of a hierarchical structure for achieving bandwidth segregation compromises the simplicity of the basic scheduler.

What is desired in the art of scheduling for data packet networks is an improved scheduler apparatus that achieves hierarchical bandwidth segregation without compromising the simplicity of the basic scheduler.

SUMMARY OF THE INVENTION

It is an object of the present invention to define a scheduler apparatus for hierarchical bandwidth segregation. The objective of the new technique is to provide bandwidth guarantees to individual data packet flows as well as to aggregations of those flows (referred to as "bundles") in a completely transparent manner, i.e., without using any additional scheduling structure. For each bundle, the scheduler determines the ratio between the bandwidth nominally allocated to the bundle and the sum of the individual bandwidth allocations of the flows that are currently backlogged in the bundle. The scheduler uses that ratio to modulate the timestamp increments that regulate the distribution of bandwidth to the individual flows. In this manner, the greater the ratio for that bundle, the more the bandwidth that each backlogged flow in the bundle receives. The scheduler always meets the bandwidth requirements of a given data packet flow as long as the flow remains backlogged, and the bandwidth requirements of a given bundle as long as there is at least one backlogged flow in the bundle.

More particularly, the scheduler apparatus of the present invention schedules the transmission of data packets for a plurality of data packet flows, said data packet flows being allocated given shares of the transmission capacity r of a communication link and being grouped in bundles, said bundles being allocated service shares of the processing capacity of said communication link, the transmission over the communication link being divided in service frames, a service frame offering at least one transmission opportunity to every data packet flow that is backlogged, a backlogged data packet flow being a data packet flow that has at least one data packet stored in respective one of a plurality of packet queues, the scheduling apparatus comprising: (1) means for determining the duration of the service frame; and (2) means for guaranteeing that each data packet flow always receives at least its allocated service share if it remains continuously backlogged over a sufficient number of consecutive service frames, and that each bundle receives at least its allocated service share if there is always at least one data packet flow in the bundle that remains continuously backlogged for the whole duration of a service frame over a sufficient number of consecutive service frames, said guaranteeing means including: (A) means for maintaining, for each bundle I, a cumulative share $\Phi_I$ that relates to the sum of said service shares allocated to respective ones of said data packet flows that are grouped together in the same bundle I; and (B) means for computing, for each bundle I, a service ratio between the service share $R_I$ allocated to said bundle I and said cumulative share $\Phi_I$ of the bundle; and (C) means for modulating said service shares allocated to respective ones of said plurality of data packet flows using the service ratio computed for respective ones of said plurality of bundles.

The present invention is also directed to a method for scheduling the transmission of data packets for a plurality of data packet flows, said data packet flows being allocated given shares of the transmission capacity of an outgoing communication link and being grouped in a plurality of bundles, said bundles being allocated service shares of the transmission capacity r of said outgoing communication link, the transmission over the communication link being divided in service frames, a service frame offering at least one transmission opportunity to every data packet flow that is backlogged, a backlogged data packet flow being a data packet flow that has at least one data packet stored in respective one of a plurality of packet queues, the method comprising the steps of: (1) determining the duration of the service frame; (2) guaranteeing that each data packet flow always receives at least its allocated service share if it remains continuously backlogged over a sufficient number of consecutive service frames, and that each bundle receives at least its allocated service share if there is always at least one data packet flow in the bundle that remains continuously backlogged for the whole duration of a service frame over a sufficient number of consecutive service frames; (3) maintaining, for each bundle I, a cumulative share $\Phi_I$ that relates to the sum of said service shares allocated to respective ones of said data packet flows that are grouped together in the same bundle I; (4) computing, for each bundle I, a service ratio between the service share $R_I$ allocated to said bundle I and said cumulative share $\Phi_I$ of the bundle; and (5) modulating said service shares allocated to respective ones of said plurality of data packet flows using the service ratio computed for respective ones of said plurality of bundles.

BRIEF DESCRIPTION OF THE DRAWINGS

In the drawings,

FIG. 3A shows an example of pseudo-code used in a Deficit Round Robin (DRR) algorithm when a new packet arrives at the head of a flow queue.

FIG. 3B shows an example of pseudo-code used in a Surplus Round Robin (SRR) algorithm when the server completes the transmission of a packet.

FIG. 8 shows an example of pseudo-code used by the scheduler after completing the transmission of a packet.

In the following description, identical element designations in different figures represent identical elements. Additionally in the element designations, the first digit refers to the figure in which the designated element is first located (e.g., the element designated as 102 is first located in FIG. 1).

DETAILED DESCRIPTION

Figure 1:
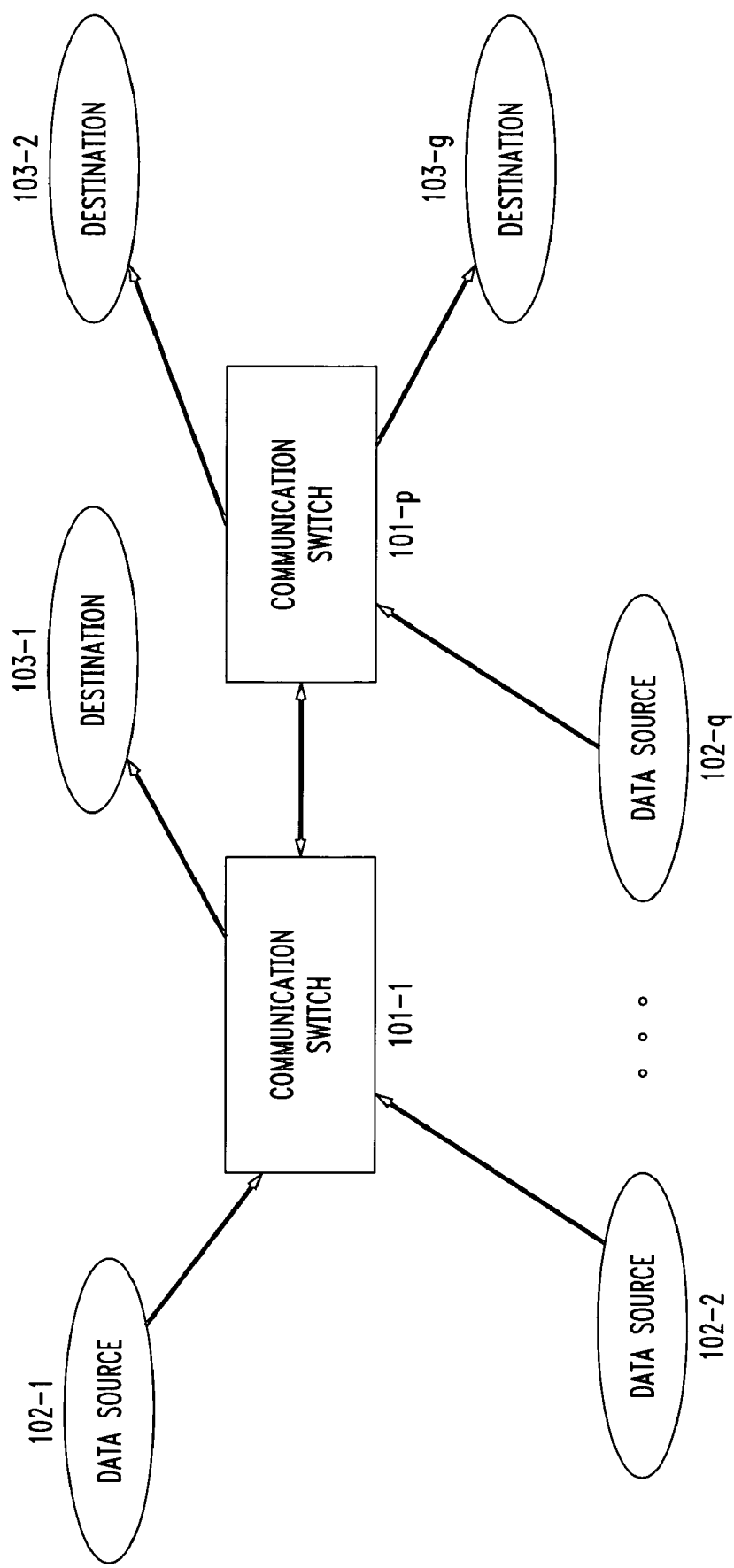
FIG. 1 shows an illustrative packet network including data sources, communication switches, and data destinations.

FIG. 1 shows an illustrative packet network in which a plurality of switches 101-1 through 101-p are connected to each other by communication links. A number of data sources 102-1 through 102-q are connected to the communication switches. A network connection is established from each of the data sources to a corresponding destination 103-1 through 103-g, and data packets are transmitted from each data source to the corresponding destinations.

Figure 2:
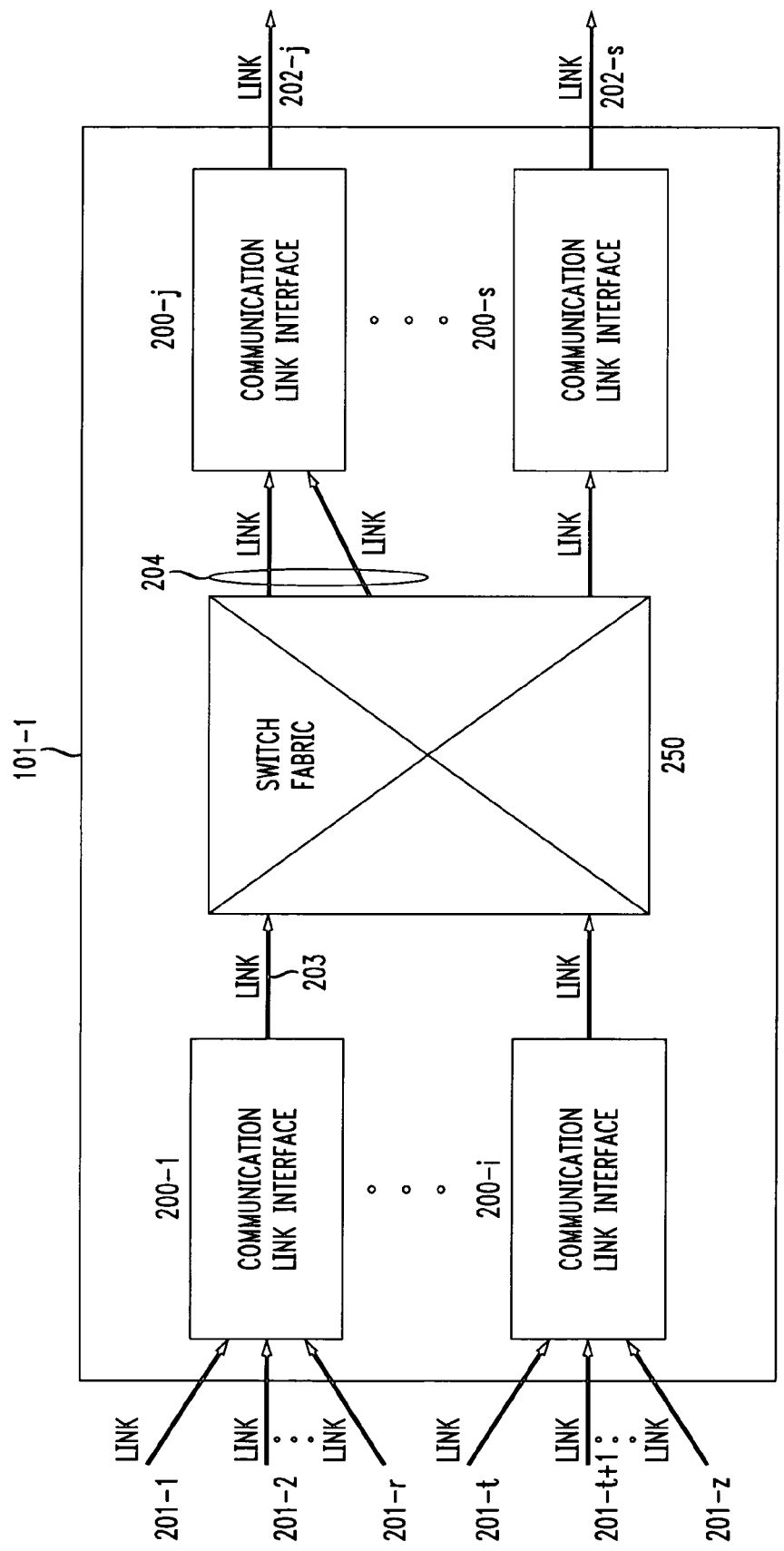
FIG. 2 shows an illustrative communication switch used in the packet network of FIG. 1.

FIG. 2 shows an illustrative block diagram of the communication switch 101-1 of the packet network. As shown, the communication switch includes a switch fabric 250 and a plurality of communication link interfaces 200-1 through 200-s. Each of the communication link interfaces connects a plurality of input links to an output link and transfers data packets from the input links to the output link. The communication switch 101-1 may contain just one or a plurality of such communication link interfaces 200. For example, input communication link interface 200-1 is located in front of the switch fabric 250, in which case its input links 201-1 through 201-r are input links of the communication switch 101-1, and its output link 203 connects to the switch fabric 250. As a second example, output communication link interface 200-j is located at the output of the switch fabric 250, where its input links may be a plurality of output links 204 of the switch fabric 250, and its output link is an output link 202-j of the communication switch 101-1. It should be noticed that packets received over a particular link or over different links may or may not have the same length. For example, if the switch fabric 250 is an Asynchronous Transfer Mode (ATM) switch and the network of FIG. 1 is an ATM network, then all packets have the same length. In the following description of the invention, the assumption is that packets received over a particular link or over different links have not necessarily the same length.

As will be discussed in a later paragraph with reference to FIG. 6, each of the communication link interfaces 200 of FIG. 2 typically includes at least a packet receiver, a scheduler, and a packet transmitter. As stated above, the scheduler may be a Weighted Round Robin (WRR) scheduler [9, 10, 11], which in turn may be implemented according to a Deficit Round Robin (DRR) [10] or a Surplus Round Robin (SRR) [11] algorithm.

The Deficit Round Robin (DRR) algorithm is one of the most popular instances of a WRR scheduler for variable-sized packets, due to its minimal implementation complexity and its efficiency in servicing the flows in proportion to their allocated service shares. Conforming to the WRR paradigm, the DRR algorithm associates a service share $\rho_i$ with each configured flow i. The service shares translate into minimum guaranteed service rates when their sum over all configured flows does not exceed the capacity r of the server:

$$\sum_{i=1}^{V} \rho_i \quad (1)$$

The bound of eq. (1), where V is the total number of configured flows, guarantees that flow i receives service at a long-term rate that is not lower than $\rho_i$.

The DRR algorithm divides the activity of the server into service frames. The present invention refers to a formulation of the algorithm that uses a reference timestamp increment $T_Q$ to express the frame duration in a virtual-time domain. This formulation is functionally equivalent to the definition of DRR originally presented in [10], but is better suited to the description of the invention.

Within a frame, each configured flow i is entitled to the transmission of a quantum $Q_i$ of information units such that $$Q_i = \rho_i T_Q \quad (2)$$

The scheduler visits the backlogged flows only once per frame, and therefore fulfills in a single shot their service expectations for the frame. Each flow i maintains a queue of packets (flow queue), and a timestamp $F_i$ that is updated every time a new packet $p_i^k$ of length $l_i^k$ reaches the head of the flow queue:

$$F_i^k = F_i^{k-1} + \frac{l_i^k}{\rho_i} \quad (3)$$

The scheduler keeps servicing the flow as long as its timestamp remains smaller than $T_Q$. When the timestamp $F_i$ exceeds the reference timestamp increment $T_Q$, the scheduler declares the visit to flow i over, subtracts $T_Q$ from the timestamp of flow i, and looks for another backlogged flow to serve. As a result, after subtraction of $T_Q$, the value of $F_i$ expresses a service credit for flow i. In general, the timestamps carry over the service credits of the backlogged flows to the following frames, allowing the scheduler to distribute service proportionally to the allocated service shares in the long term (i.e., over multiple frames).

When a flow i becomes idle, the scheduler immediately moves to another flow to start giving it service. If flow i becomes backlogged again in a short time, it must wait for the next frame to start in order to receive a new visit from the server. When the flow becomes idle, its timestamp is reset to zero to avoid any loss of service when the same flow becomes backlogged again in a future frame. By construction, the timestamp of an idling flow is always smaller than $T_Q$, so that the timestamp reset never generates extra service credits that would otherwise penalize other flows.

By construction, at the beginning of a service frame the value of timestamp $F_i$ of flow i ranges between 0 and $L_i/\rho_i$ where $L_i$ is the maximum size of a packet of flow i. The fluctuation of the initial value of the timestamp induces the fluctuation of the amount of information units that flow i transmits in a frame, which ranges within the interval $(Q_i-L_i,Q_i+L_i)$. Accordingly, the total amount of information units that the server transmits in a frame is not fixed, even when all configured flows are permanently backlogged.

The DRR scheduler was implemented in [10] with a single linked list of backlogged flows, visited in FIFO order. The arrangement of the backlogged flows in a single FIFO queue leads to O(1) implementation complexity, provided that the reference timestamp increment $T_Q$ is not smaller than the timestamp increment determined by the maximum-sized packet for the flow with minimum service share:

$$T_Q \geq \frac{L_{max}}{\rho_{min}} \quad (4)$$

If the condition of eq. (4) is not satisfied, the algorithmic complexity of the scheduler explodes with the worst-case number of elementary operations to be executed between consecutive packet transmissions (elementary operations include: flow extraction and insertion in the linked list; timestamp update; comparison of the timestamp with the reference timestamp increment). In fact, the scheduler may have to deny service to a given flow for several consecutive frames, until the repeated subtraction of the reference timestamp increment makes the timestamp fall within the $[0,T_Q)$ interval. Shown in FIG. 3A is an illustrative listing of pseudo-code that specifies the rules for handling flow i and updating its timestamp in DRR when a new packet reaches the head of its queue.

A description of Surplus Round Robin (SRR) is provided in [11]. The algorithm features the same parameters and variables as DRR, but a different event triggers the update of the timestamp: a flow i receives a new timestamp $F_i^k$ when the transmission of packet $p_i^k$ gets completed, independently of the resulting backlog state of the flow. The end of the frame is always detected after the transmission of a packet, and never before: the timestamp carries over to the next frame the debit accumulated by the flow during the current frame, instead of the credit that is typical of DRR.

An advantage of SRR over DRR is that it does not require knowing in advance the length of the head-of-the-queue packet to determine the end of the frame for a flow. Conversely, in order to prevent malicious flows from stealing bandwidth from their competitors, the algorithm cannot reset the timestamp of a flow that becomes idle. The non-null timestamp of an idle flow is eventually obsoleted by the end of the same frame in which the flow becomes idle. Ideally, the timestamp should be reset as soon as it becomes obsolete. However, in a scheduler that handles hundreds of thousands or even millions of flows, a prompt reset of all timestamps that can simultaneously become obsolete is practically impossible. The present description of the invention focuses on implementations of the SRR algorithm that do not perform any check for obsolescence on the timestamps of the idle flows, and where a newly backlogged flow always resumes its activity with the latest value of the timestamp, however old that value can be. The effect of this assumption is that a newly backlogged flow may have to give up part of its due service the first time it is visited by the server, in consequence of a debit accumulated long time before. Shown in FIG. 3B is an illustrative listing of pseudo-code that specifies the rules for handling flow i and updating its timestamp in SRR when the server completes the transmission of packet $P_i^k$.

For simplicity of presentation, in the rest of this document the Weighted Round Robin (WRR) name will be used to allude to DRR or SRR generically, with no explicit reference to their distinguishing features.

WRR schedulers are essentially "single-layered," in that they can control the distribution of bandwidth only to individual packet flows. Superimposing multiple scheduling layers, and thus implementing a hierarchical and flexible structure that can not only allocate bandwidth to individual flows, but also create aggregations of flows and segregate bandwidth accordingly, compromises the simplicity of these schedulers.

Figure 4:
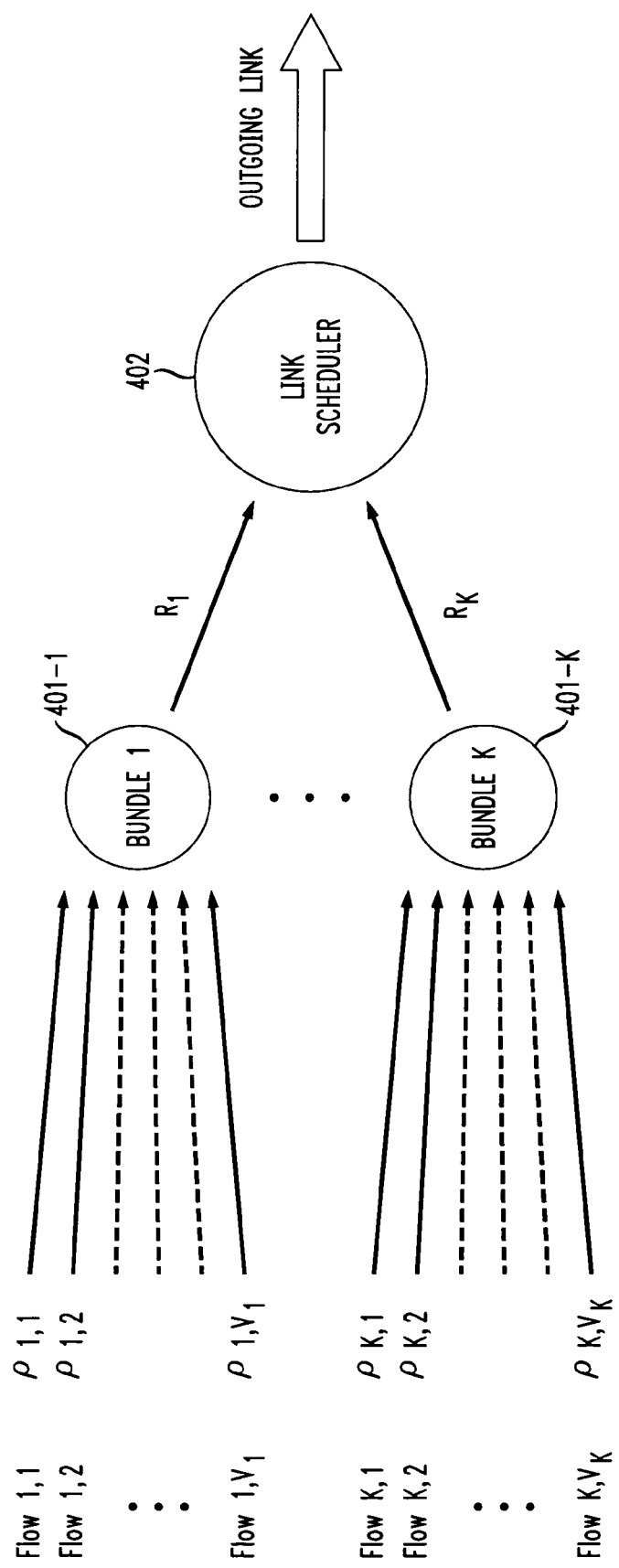
FIG. 4 shows, in accordance with the present invention, a diagram illustrating the two-layered logical organization of the scheduler.

The reference model for bandwidth segregation is shown in FIG. 4. The set of allocated flows $(1,1)$–$(K,V_K)$ is partitioned into K subsets 401-1 through 401-K called bundles. Each bundle I aggregates $V_I$ flows and has an allocated service rate $R_I$. The logical organization of the scheduler reflects a two-layered hierarchy: it first distributes bandwidth to the bundles according to their aggregate allocations, and then serves the flows based on their bandwidth allocations and on the backlog state of the other flows in the respective bundles. The scheduler treats each bundle independently of the backlog state of the corresponding flows, as long as at least one of them is backlogged. The scheduler aims at the enforcement of strict bandwidth guarantees for both the flow aggregates and the individual flows within the aggregates, without trying to support delay guarantees of any sort (frameworks for the provision of stringent delay guarantees in a scheduling hierarchy are already available [7, 12], but they all resort to sophisticated algorithms that considerably increase the complexity of the scheduler). In order to support the bandwidth requirements of the flow aggregates, the following condition must always hold on the rate allocations of the bundles:

$$\sum_{I=1}^{K} R_I \leq r \quad (5)$$

Similarly, the following bound must be satisfied within each bundle I in order to meet the bandwidth requirements of the associated flows:

$$\sum_{i \in I} \rho_i \leq R_I \qquad (6)$$

A scheduling solution inspired by the frameworks presented in [7, 12] would introduce a full-fledged (and expensive) scheduling layer to handle the bundles in between the flows and the link server. Generally, the implementation cost of a full-fledged hierarchical scheduler grows linearly with the number of bundles, because each bundle requires a separate instance of the basic per-flow scheduler. In the present invention, on the contrary, the layer that enforces the bundle requirements in the scheduling hierarchy is purely virtual, and is superimposed on a single instance of the basic scheduler. The cost of the structure that handles the individual flows is therefore independent of the number of configured bundles, which leads to substantial savings in the implementation of the scheduling hierarchy.

In accordance with the present invention, an enhanced WRR scheduler segregates bandwidth hierarchically without requiring substantial modifications of the basic structure of a WRR scheduler. According to the new technique, the scheduler provides bandwidth guarantees to aggregations of flows (the bundles) as well as to individual flows in a completely transparent manner, i.e., without using any additional scheduling structure. The invention achieves this objective by simply enhancing the way the scheduler manipulates the timestamps. The resulting "soft" scheduling hierarchy has negligible complexity; yet, it is effective in providing bandwidth guarantees to the bundles as well as to the individual flows.

Figure 5:
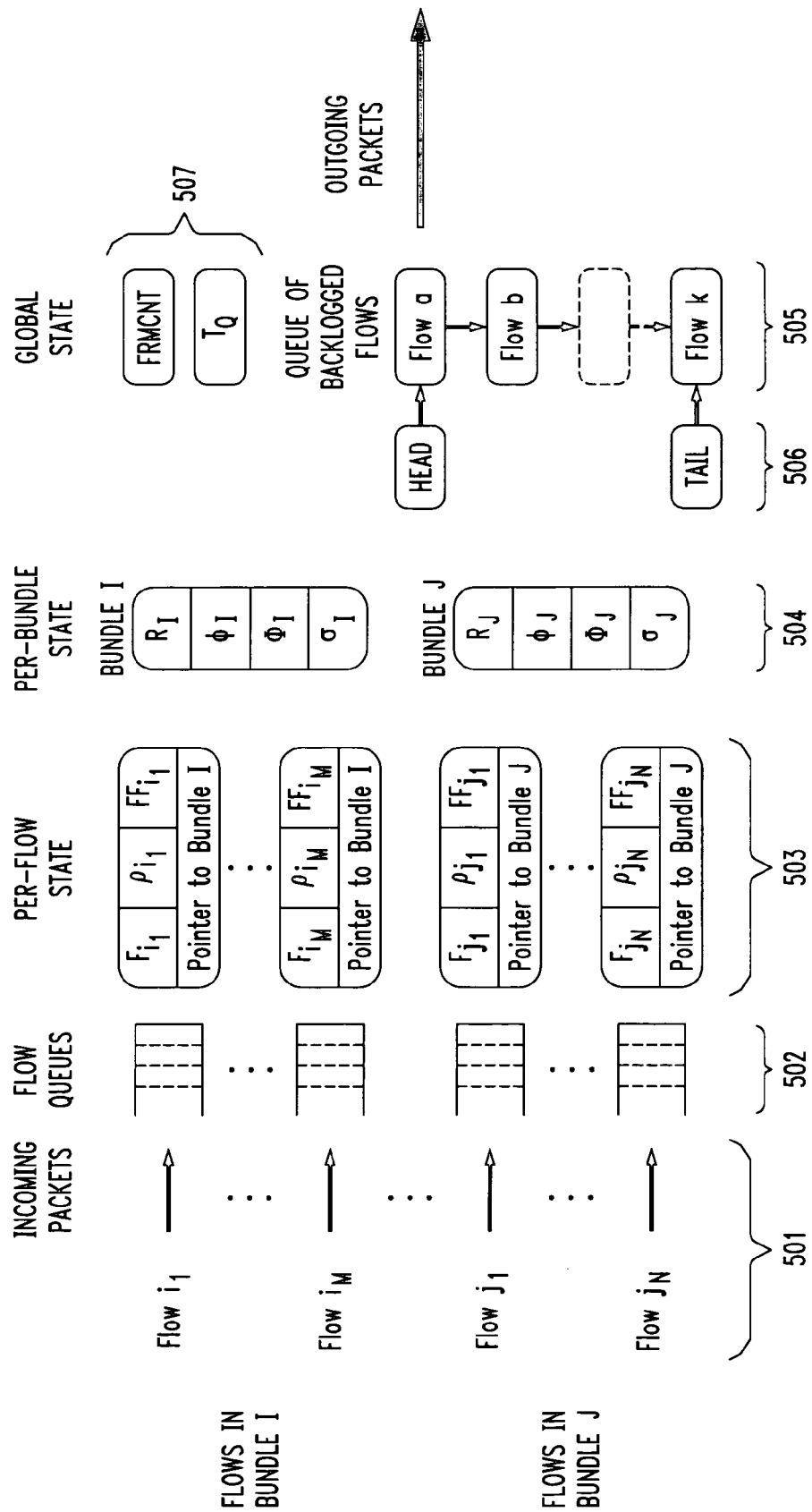
FIG. 5 shows a functional diagram of the queues, state tables, registers, and parameters utilized by the scheduler of the present invention.

FIG. 5 shows a functional diagram of the queues, state tables, registers, and parameters utilized by the enhanced WRR scheduler for the soft enforcement of hierarchical bandwidth segregation. With joint reference to FIGS. 4 and 5, the scheduler handles a plurality 501 of data packet flows $i_I$ through $j_N$, which are grouped in a plurality of bundles 401-1 through 401-K. The flow queues 502 store data packets for respective ones of the data packet flows 501. The flow queues 502 may be implemented as First-In-First-Out (FIFO) queues. Each of the flow queues 502 has an associated per-flow state table 503, which stores several variables for the corresponding flow 501. In the case of flow $i_I$, for example, the per-flow state table 503 includes a timestamp $F_{i_I}$, a minimum guaranteed service rate $\rho_{i_I}$, a frame flag $FF_{i_I}$, a pointer to the bundle I that includes the flow, and the head and tail pointers of the associated flow queue 502 (not shown). The state of the bundles is maintained in the per-bundle state tables 504. In the case of bundle I, for example, the per-bundle state table 504 stores the aggregate bandwidth allocation $R_I$, the running share $\phi_I$, the cumulative share $\Phi_I$, and the start flag $\sigma_I$. A FIFO queue 505 of flow pointers determines the order by which the scheduler visits the flows 501 to transmit their packets. The registers 506 store the head and tail pointers of the FIFO queue of flow pointers 505. The scheduler maintains global-state information in table 507. The table contains a frame counter FRMCNT and a reference timestamp increment $T_Q$.

Figure 6:
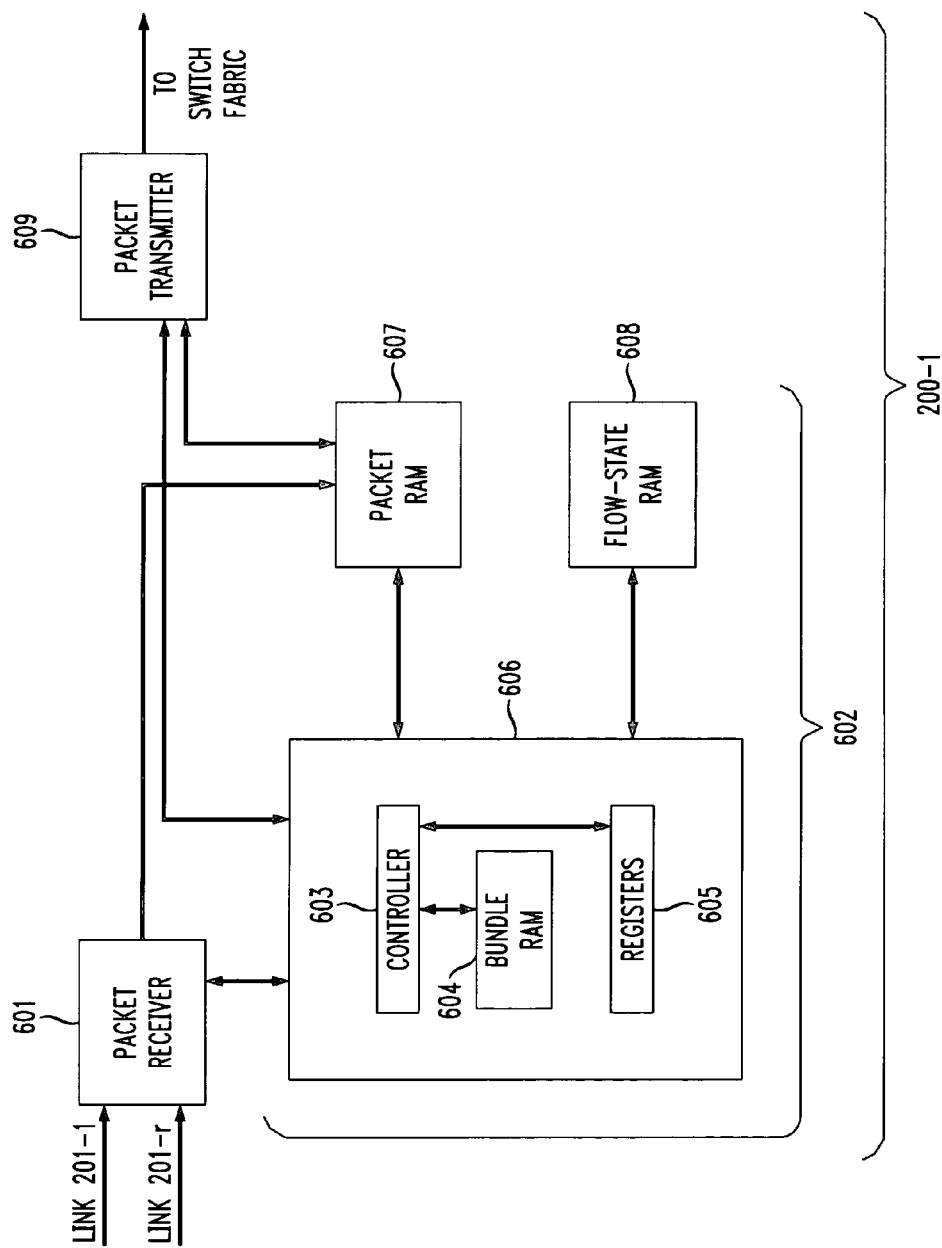
FIG. 6 shows an illustrative block diagram of a particular implementation of the apparatus of FIG. 5.

FIG. 6 shows an illustrative block diagram of an input communication link interface 200 in which the scheduler may be utilized. The communication link interface 200 includes a data packet receiver 601, a scheduler 602, and a packet transmitter 609. Illustratively, the scheduler 602 is shown to include a controller 603, a per-bundle-state RAM 604, and registers 605, all on the same chip 606. A packet RAM 607 and a per-flow-state RAM 608 are shown as being located on separate chips. Obviously, depending on the operating capacity and other characteristics, the scheduler 602 may be implemented in other configurations.

The controller 603 stores and runs the program that implements the method of the present invention. An illustrative example of the program that controls the operation of the communication link interface 200 is shown in flow-chart form in FIGS. 7A–B. With joint reference to FIGS. 5 and 6, the packets in the flow queues 502 are stored in packet RAM 607; the per-flow state tables 503 are stored in per-flow-state RAM 608; the head and tail pointers 506 of the FIFO queue of flow pointers 505 and the global-state table 507 are stored in registers 605.

A brief overview of the operation of the scheduler 602 is as follows. The packet receiver 601 receives from input links 201-1 through 201-$r$ the data packets of the data packet flows 501. Packet receiver 601 uses the contents of a flow-identification field contained in the header of each packet (not shown) to identify its respective data packet flow 501. The identification of the data packet flow 501 leads to the identification of the associated flow queue 502 and bundle 401. The scheduler 602 uses the entries of the per-bundle state table 504 to compute a service ratio for each bundle I. The service ratio of bundle I is defined as the ratio between the nominal bandwidth allocation $R_I$ and the cumulative share $\Phi_I$ of the bundle (the cumulative share $\Phi_I$ accumulates the bandwidth allocations of the backlogged flows of bundle I). By construction, the service ratio of bundle I is never smaller than 1. The service ratio is involved in the computation of the timestamp increments for the individual flows, where it determines an increase in the amount of service that each backlogged flow of bundle I receives during a frame when other flows of the same bundle are detected to be idle at the beginning of the frame. The modulation of the timestamp increments induced by the service ratio is such that the scheduler can still guarantee both the aggregate bandwidth allocations of the bundles and the individual bandwidth allocations of the flows.

DETAILED OPERATION

The enhanced WRR scheduler of the present invention achieves hierarchical segregation of service bandwidth by superimposing a virtual scheduling layer on a WRR scheduler of the prior art. The scheduler supports a multitude of bundles, each bundle being an aggregate of data packet flows. In a timestamp-based formulation of the underlying WRR scheduler (at this point of the discussion, the distinction between DRR and SRR is not yet relevant), the technique of the present invention relies on a simple modification of the timestamp-updating rule to preserve the bandwidth guarantees of the individual flows and at the same time satisfy the aggregate requirements of the bundles.

For each configured bundle I, the scheduler maintains a nominal bandwidth allocation $R_I$ and a cumulative share $\Phi_I$. The nominal bandwidth allocation $R_I$ is never smaller than the sum of the bandwidth allocations of all the flows in the bundle. The cumulative share $\Phi_I$ tracks the sum of the bandwidth allocations of the backlogged flows of bundle I, and is therefore never greater than $R_I$:

$$\Phi_I = \sum_{i \in B_I} \rho_i \qquad (7)$$

In eq. (7), $B_I$ is the set of flows of bundle I that are backlogged at the beginning of the frame.

The scheduler uses the service ratio between the cumulative rate allocation $R_I$ and the cumulative share $\Phi_I$ of bundle I to modulate the actual service bandwidth that is granted to the flows of the bundle. More particularly, the service ratio contributes to defining the timestamp increments for the flows of the bundle. What follows is the timestamp update associated with packet $p_i^k$ of flow i:

$$F_i^k = F_i^{k-1} + \frac{l_i^k}{\rho_i} \cdot \frac{\Phi_I}{R_I} \qquad (8)$$

Verifying that the timestamp assignment rule of eq. (8) actually enforces the bandwidth guarantees of the bundles requires to compute the amount of service that the individual flows in bundle I may expect to receive during a frame. In principle, when the service ratio $R_I/\Phi_I$ is greater than 1.0 for bundle I, the timestamp assignment rule of eq. (8) results in the individual flows of bundle I getting a service bandwidth that is $R_I/\Phi_I$ times higher than their nominal bandwidth allocation. The computation is based on the following two assumptions: (1) the cumulative share $\Phi_I$ of the bundle remains unchanged during the whole frame, independently of the backlog dynamics of the flows in the bundle; and (2) the set of flows that can access the server during the frame includes only the flows that are backlogged at the beginning of the frame (if some flows in the bundle become backlogged after the frame has started, they must wait until the beginning of a new frame before they can access the server).

The reference timestamp increment $T_Q$, combined with eq. (8), sets the reference amount of service $Q_i$ that flow i of bundle I expects to receive during a frame:

$$T_Q = \frac{Q_i}{\rho_i} \cdot \frac{\Phi_I}{R_I} \qquad (9)$$

Then, the aggregation of the service quanta of all the flows in bundle I leads to the service quantum $Q_I$ of the bundle:

$$Q_I = \sum_{i \in B_I} Q_i = \frac{\sum_{i \in B_I} \rho_i}{\Phi_I} \cdot R_I \cdot T_Q = R_I \cdot T_Q \qquad (10)$$

The expression of $Q_I$ in eq. (10) is identical to the expression of the flow quantum $Q_i$ in eq. (2), and therefore proves that the timestamp-updating rule of eq. (8) preserves the bandwidth guarantees of bundle I, independently of the composition of the set of flows that are backlogged in the bundle at the beginning of the frame.

Holding on the assumption that the cumulative share of bundle I does not change during the frame, it can also be shown that the timestamp updating rule of eq. (8) preserves the service proportions for any two flows i, j of bundle I that never become idle during the frame:

$$\frac{Q_i}{Q_j} = \frac{\rho_i \cdot \frac{R_I}{\Phi_I} \cdot T_Q}{\rho_j \cdot \frac{R_I}{\Phi_I} \cdot T_Q} = \frac{\rho_i}{\rho_j} \qquad (11)$$

The specification of the details of the WRR algorithm with bandwidth segregation requires a discussion of the assumptions that produce the results of eqs. (10) and (11) and the evaluation of their algorithmic implications. The use of a constant value of cumulative share $\Phi_I$ in all the timestamp increments that the scheduler computes during a frame provides a common reference for consistently distributing service to the flows of bundle I. Identical purpose has the exclusion from the service frame of the flows that become backlogged only after the frame has started. The timestamp increment can be viewed as the charge that the system imposes on a flow for the transmission of the related packet. The cost of the transmission depends on the bandwidth that is available within the bundle at the time it is executed. In order to make the timestamp increment consistent with the cost of the bandwidth resource within the bundle, it must be computed when the resource is used, i.e., upon the transmission of the corresponding packet. If the scheduler computes the increment in advance, the state of the bundle (and therefore the actual cost of the bandwidth resource) can undergo radical changes before the transmission of the packet occurs, thus making the charging mechanism inconsistent with the distribution of bandwidth.

Within the pair of WRR algorithms under consideration, SRR is the one that best fits the requirement for consistency between transmissions and timestamp increments, because it uses the length of the just transmitted packet to update the timestamp and determine the in-frame status of the corresponding flow. In DRR, on the contrary, the scheduler performs the timestamp update and the in-frame status check using the length of the new head-of-the-queue packet, possibly long before it is actually transmitted. When the DRR server finally delivers the packet, the cumulative share of the bundle, and therefore the cost of bandwidth within the bundle, may have changed considerably since the latest timestamp update.

Introducing the mechanism for bandwidth segregation in SRR is straightforward. In addition to the minimum-bandwidth guarantee $R_I$ and the cumulative share $\Phi_I$, each bundle I maintains a running share $\phi_I$ and a start flag $\sigma_I$. The running share keeps instantaneous track of the sum of the service shares of the backlogged flows in the bundle:

$$\phi_I(t) = \sum_{i \in B_I(t)} \rho_i \forall t \qquad (12)$$

The running share is updated every time a flow of the bundle changes its backlog state. In general, the updates of the running share $\phi_I$ do not translate into immediate updates of the cumulative share $\Phi_I$. In fact, the scheduler updates the cumulative share $\Phi_I$ of the bundle only upon detection of mismatching values in the start flag $\sigma_I$ and in a global single-bit frame counter FRMCNT that the scheduler toggles at every frame boundary (the scheduler compares $\sigma_I$ and FRMCNT every time it starts servicing a flow of bundle I). A difference in the two bits triggers the update of the cumulative share to be used in the future timestamp computations ($\Phi_I \leftarrow \phi_I$) and toggles the start flag of the bundle ($\sigma_I \leftarrow$FRMCNT). If, instead, the two bits are already equal, the service just completed is certainly not the first one that the bundle receives during the current frame, and no action must be taken on the bundle parameters. When the first flow of a bundle becomes backlogged, the start flag is set equal to FRMCNT:

$$\sigma_I \leftarrow \text{FRMCNT} \quad (13)$$

In order to identify the end of a frame, each flow i maintains a frame flag $FF_i$. The frame flag of flow i is set to the complement of FRMCNT whenever the flow is queued to the tail of the list of backlogged flows 505. When the scheduler finds a frame flag that does not match the frame counter, it declares the start of a new frame and toggles the frame counter. The sequence of operations to be executed after completing the transmission of a packet is summarized in the pseudo-code of FIG. 8.

Figure 7A:
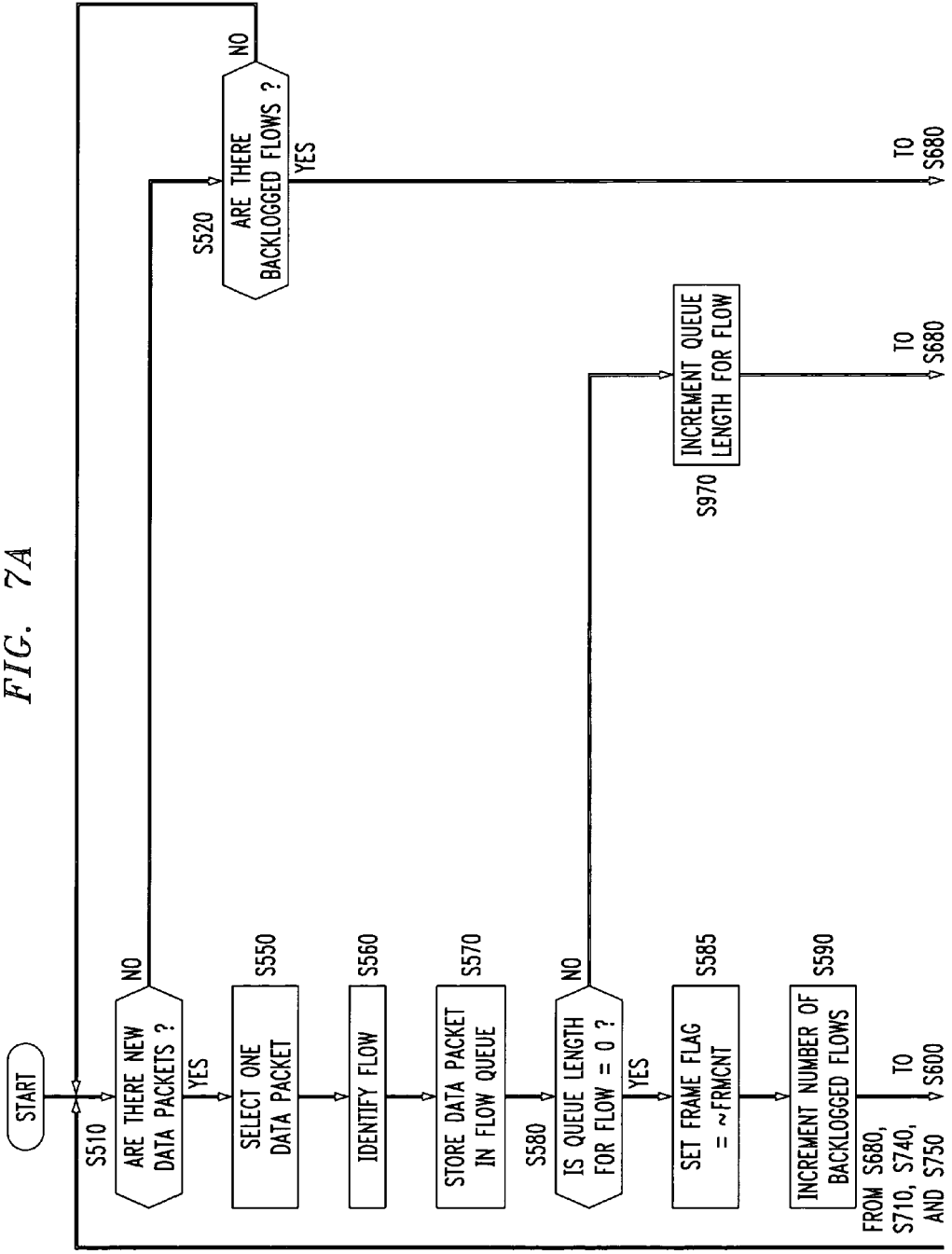
FIGS. 7A to 7D show an illustrative flowchart describing a method of scheduling the transmission of packets in accordance with the present invention.
Figure 7B:
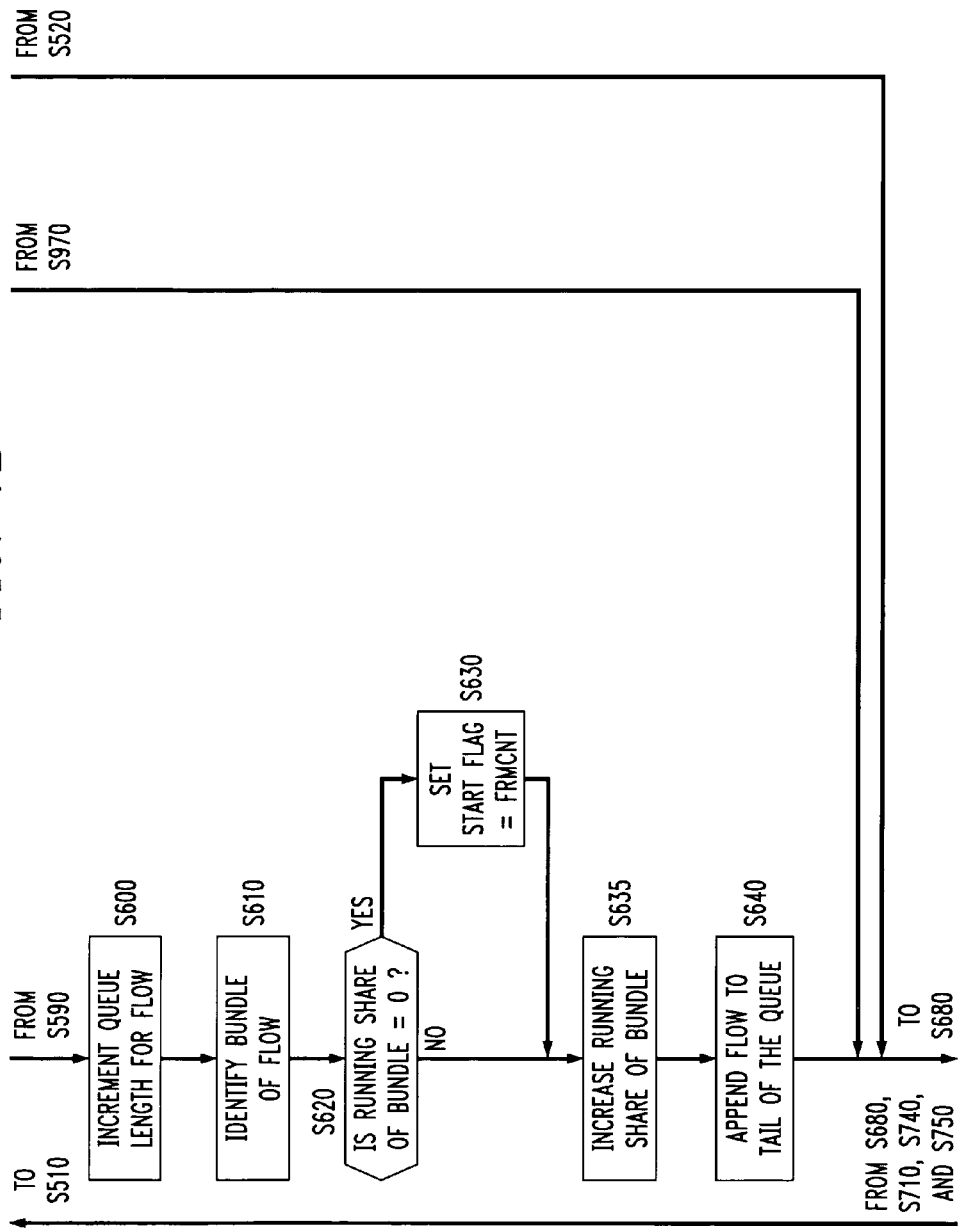
Figure 7C:
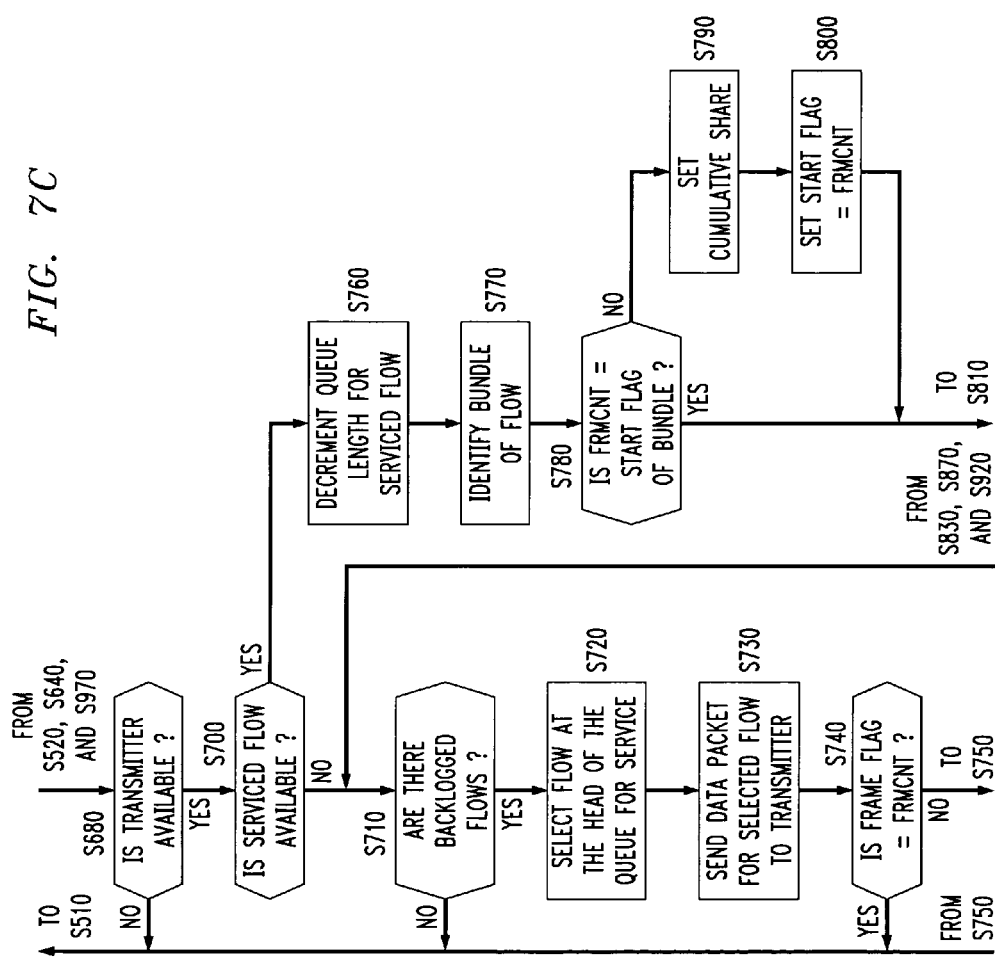
Figure 7D:
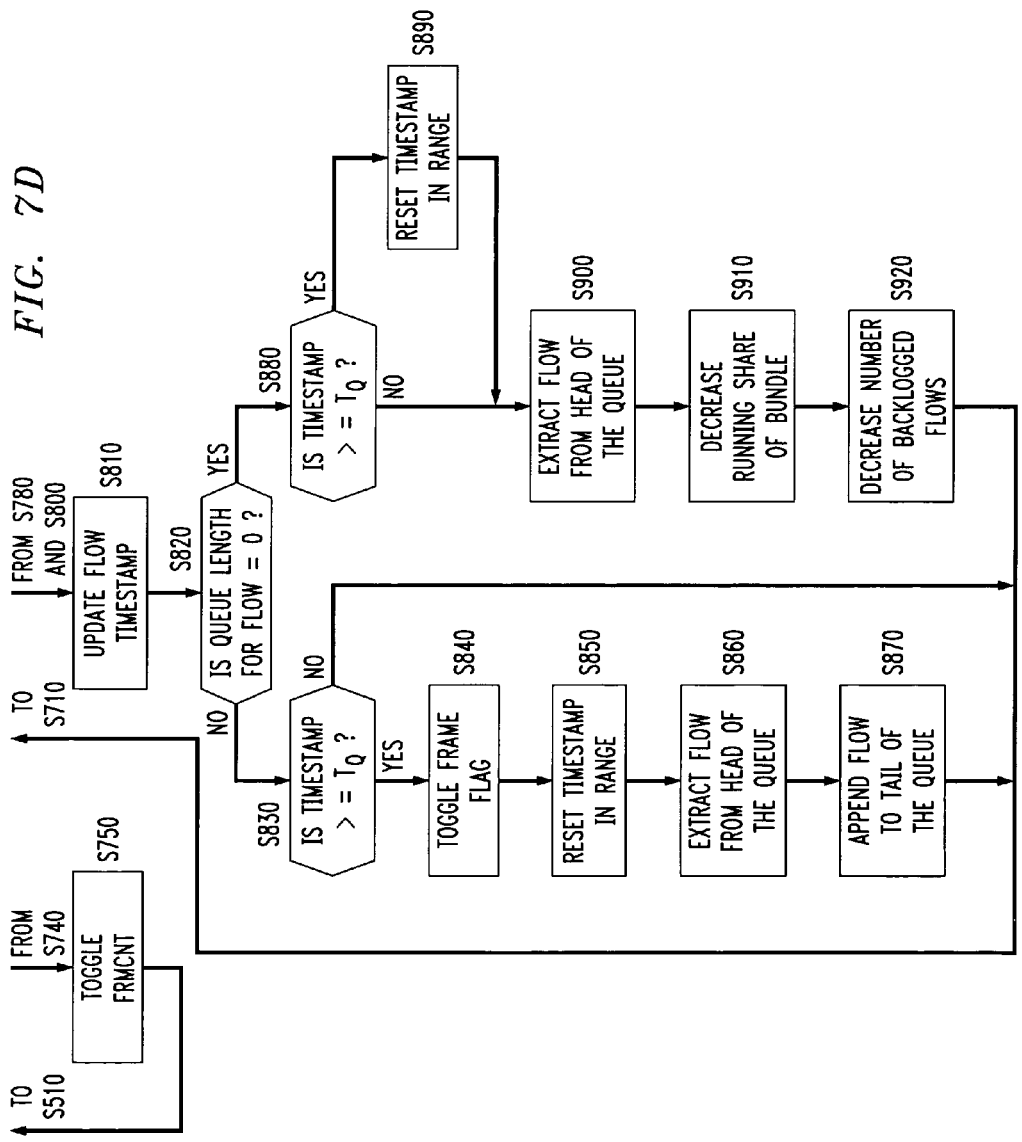

FIGS. 7A–B depict in flow-chart form a method of operating the scheduling apparatus of FIG. 6 for controlling the scheduling of packet transmissions in accordance with the present invention. The flow chart of FIGS. 7A–B and the pseudo-code of FIG. 8 are based on the assumption that SRR is the underlying scheduling algorithm. As far as functionality is concerned, there is no problem in using DRR instead of SRR. Similarly, the apparatus of FIG. 5 implements the soft scheduling hierarchy using a single FIFO queue of backlogged flows. Any other queueing structure that allows a clear separation of in-frame and out-of-frame flows could be used as well.

The following description makes reference to FIGS. 4, 5, 6, and 7A–B. The reference numbers to elements that first appear in FIGS. 4 (5, 6) begin with a 4 (5, 6), while the steps of FIGS. 7A–B are indicated by an S preceding the step number, e.g., S510.

In FIG. 7A, the controller 603 checks in S510 if there are newly received data packets. If there are no newly received packets in S510, and there are backlogged flows in S520, control passes to S680. If, instead, there are no newly received data packets in S510 and there are no backlogged flows in S520, then the controller 603 cycles between steps S510 and S520 until there are new packets received. When the presence of newly received packets is detected at receiver 601 in S510, the controller 603 selects one of the packets in S550. Then, the controller 603 identifies the flow of the data packet in S560, and finally stores the packet in the appropriate flow queue 502 (in S570). If the queue length for the identified flow is not zero in S580, the queue length for that flow is incremented in S970 and control passes to S680. If, instead, the queue length for the identified flow is zero in S580, the frame flag of the flow (in per-flow state table 503) is set to the complement of FRMCNT (in global-state table 507) in S585; then, the controller increases the total number of backlogged flows in S590 and the queue length for the identified flow in S600. The bundle of the identified flow is identified in S610 using the bundle pointer of per-flow state table 503. In S620, it is determined if the running share of the bundle is equal to zero. If the running share of the identified bundle is null, in S630 the controller 603 sets the start flag of the bundle (stored in per-bundles state table 504) to the value of the global frame counter FRMCNT. Then, control passes to S635. If, instead, the running share of the bundle is not zero in S620, control passes directly from S620 to S635. In S635, the running share of the identified bundle is increased by the bandwidth allocation of the newly-backlogged flow. Then, in S640, the flow is appended to the tail of the FIFO queue of flow pointers 505, and, after that, control passes to S680.

In S680, if the transmitter 609 is busy in the transmission of an old packet and is therefore not available for the transmission of a new packet, control returns to S510; otherwise, the availability of a just serviced flow waiting for post-service processing is checked in S700. If a just serviced flow is not available in S700, it is determined in S710 if there are any backlogged flows. If no backlogged flows exist, control returns to S510, otherwise the flow 501 at the head 506 of the FIFO queue of flow pointers 505 is selected for service in S720 and the first data packet in the flow queue 502 of the selected flow is sent to transmitter 609 in S730. In S740, if the frame flag of the flow 501 selected for service is equal to the global frame counter FRMCNT, then control returns to S510; otherwise the global frame counter FRMCNT is toggled in S750 and control returns to S510.

In S700, if a just serviced flow 501 waiting for post-service processing is available, the controller moves to S760, where it decrements the length of the corresponding flow queue 502. The bundle 401 of the just serviced flow 501 is identified in S770 using the bundle pointer of per-flow state table 503. In S780 it is determined if the global frame counter FRMCNT is equal to the start flag of the bundle 401 of the just serviced flow 501. If the start flag is not equal to the global frame counter, the controller sets the cumulative share of the bundle equal to the running share of the bundle (in S790) and the start flag of the bundle equal to the global frame counter (in S800). Control then passes to S810 for the update of the flow timestamp. If, in S780, the start flag of the bundle of the just serviced flow is equal to the global frame counter, control passes directly to S810 for the update of the timestamp of the just serviced flow.

In S820 the controller 603 determines if the queue length of the just serviced flow is equal to zero. If the flow queue 502 of the serviced flow 501 is determined to be empty in S820, the controller checks in S880 if the timestamp of the just serviced flow is greater than or equal to the reference timestamp increment of global-state table 507. If the timestamp is greater than or equal to the reference timestamp increment, control passes to S890, where the timestamp is reset within the valid range $(0, T_Q)$. Control then passes to S900. If, in S880, the timestamp of the just serviced flow is determined to be smaller than the reference timestamp increment, control passes directly to S900. In S900, the pointer to the just serviced flow is extracted from the head 506 of the FIFO queue of flow pointers 505. Then, in S910, the running share of the bundle of the just serviced flow is decreased by the bandwidth allocation of the just serviced flow that just became idle. In S920, the controller 603 decrements the total number of backlogged flows, and then moves to S710.

If, in S820, the flow queue 502 of the serviced flow 501 is determined to be non-empty, the controller checks in S830 if the timestamp of the just serviced flow is greater than or equal to the reference timestamp increment of global-state table 507. If the timestamp is smaller than the reference timestamp increment, control passes to S840, where the frame flag of the just serviced flow is toggled. Then, in S850, the timestamp of the just serviced flow is reset within the valid range $(0, T_Q)$. In S860, the controller 603 extracts the pointer to the just serviced flow from the head 506 of the FIFO queue of flow pointers 505. The same pointer is queued back to the tail 506 of the FIFO queue 505 in S870. Control then passes to S710. In S830, if the timestamp of the just serviced flow is determined to be greater than or equal to the reference timestamp increment, control passes directly to S710.

The listing of FIG. 8 describes in pseudo-code form a method for selecting and post-service processing a flow i of bundle I in accordance with the present invention.

The illustrative embodiments described above are but exemplary of the principles that may be used to superimpose a soft scheduling hierarchy on a Weighted Round Robin scheduler to achieve hierarchical bandwidth segregation in accordance with the present invention. Those skilled in the art will be able to devise numerous arrangements which, although not explicitly shown or described herein, nevertheless embody those principles that are within the spirit and scope of the present invention as defined by the claims appended hereto.

APPENDIX

References
[1] R. Braden, D. Clark, and S. Shenker, "Integrated Services in the Internet Architecture: an Overview," Request for Comments (RFC) 1633, IETF, June 1994.
[2] K. Nichols, V. Jacobson, and L. Zhang, "A Two-bit Differentiated Services Architecture for the Internet," Request for Comments (RFC) 2638, IETF, July 1999.
[3] D. Stiliadis and A. Varma, "Design and Analysis of Frame-based Fair Queueing: A New Traffic Scheduling Algorithm for Packet-Switched Networks," Proceedings of ACM SIGMETRICS '96, pp. 104–115, May 1996.
[4] D. Stiliadis and A. Varma, "Efficient Fair Queueing Algorithms for Packet Switched Networks," IEEE/ACM Transactions on Networking, Vol. 6, No. 2, pp. 175–185, April 1998.
[5] J. C. R. Bennett and H. Zhang, "WF2Q: Worst-Case-Fair Weighted Fair Queueing," Proceedings of IEEE INFOCOM '96, pp. 120–128, March 1996.
[6] D. Stiliadis and A. Varma, "A General Methodology for Designing Efficient Traffic Scheduling and Shaping Algorithms," Proceedings of IEEE INFOCOM '97, Kobe, Japan, April 1997.
[7] I. Stoica, H. Zhang, and T. S. E. Ng, "A Hierarchical Fair Service Curve Algorithm for LinkSharing, Real-Time, and Priority Services," Proceedings of ACM SIGCOMM '97, September 1997.
[8] D. C. Stephens, J. C. R. Bennett, and H. Zhang, "Implementing Scheduling Algorithms in HighSpeed Networks," IEEE Journal on Selected Areas in Communications, Vol. 17, No. 6, June 1999, pp. 1145–1158.
[9] M. Katevenis, S. Sidiropoulos, and C. Courcoubetis, "Weighted Round Robin Cell Multiplexing in a General-Purpose ATM Switch," IEEE Journal on Selected Areas in Communications, vol. 9, pp. 1265–79, October 1991.
[10] M. Shreedhar and G. Varghese, "Efficient Fair Queueing Using Deficit Round Robin," IEEE/ACM Transactions on Networking, vol. 4, no. 3, pp. 375–385, June 1996.
[11] H. Adiseshu, G. Parulkar, and G. Varghese, "A Reliable and Scalable Striping Protocol," Proceedings of ACM SIGCOMM '96, August 1996.
[12] J. C. R. Bennett and H. Zhang, "Hierarchical Packet Fair Queueing Algorithms," Proceedings of ACM SIGCOMM '96, pp. 143–156, August 1996.

What is claimed is:

1. An apparatus for scheduling the transmission of data packets for a plurality of data packet flows, said data packet flows being allocated service shares of the transmission capacity r of a communication link and being grouped in bundles, said bundles being allocated service shares $R_I$ of the transmission capacity of said communication link, the transmission over the communication link being divided in service frames, a service frame offering at least one transmission opportunity to every data packet flow that is backlogged, a backlogged data packet flow being a data packet flow that has at least one data packet stored in respective one of a plurality of packet queues, the scheduling apparatus comprising:

means for determining the duration of the service frame; and means for guaranteeing that each data packet flow always receives at least its allocated service share during a service frame if it remains continuously backlogged over the whole duration of said service frame, and that each bundle receives at least its allocated service share during a service frame if there is always at least one data packet flow in the bundle that remains continuously backlogged for the whole duration of said service frame, said guaranteeing means including:

means for maintaining, for each bundle I, a cumulative share $\Phi_I$ that relates to the sum of said service shares allocated to respective ones of said data packet flows that are grouped together in the same bundle I;

means for computing, for each bundle I, a service ratio between the service share allocated to said bundle I and said cumulative share $\Phi_I$ of the bundle; and means for modulating said service shares allocated to respective ones of said plurality of data packet flows using the service ratio computed for respective ones of said plurality of bundles.

2. The scheduling apparatus of claim 1, wherein a Weighted Round Robin (WRR) algorithm is used to schedule the transmission of data packets.

3. The scheduling apparatus of claim 1, wherein a Deficit Round Robin (DRR) algorithm is used to schedule the transmission of data packets.

4. The scheduling apparatus of claim 1, wherein a Surplus Round Robin (SRR) algorithm is used to schedule the transmission of data packets.

5. The scheduling apparatus of claim 1, wherein the duration of said service frames is variable.

6. The scheduling apparatus of claim 1, wherein the duration of said service frames is fixed.

7. The scheduling apparatus of claim 1, wherein said means for determining the duration of a service frame include:

a global frame counter FRMCNT;

a start flag $\sigma_I$ for each bundle I of said plurality of bundles; and a frame flag $FF_i$ for each data packet flow i of said plurality of data packet flows.

8. The scheduling apparatus of claim 7, wherein the start flag $\sigma_i$ of bundle I is set equal to the global frame counter FRMCNT when the first data packet flow in the bundle becomes backlogged.

9. The scheduling apparatus of claim 7, wherein the frame flag $FF_i$ of data packet flow i is set to a different value than the global frame counter FRMCNT when the flow becomes backlogged or is processed for the last time in the current service frame.

10. The scheduling apparatus of claim 7, wherein the end of a service frame and the start of the following one are simultaneously detected when the frame flag $FF_i$ of the next data packet flow i to be processed has different value than the global frame counter FRMCNT.

11. The scheduling apparatus of claim 10, wherein the value of said global frame counter FRMCNT is set equal to the value of said frame flag $FF_i$ after detecting a difference between the two values.

12. The scheduling apparatus of claim 1, wherein the value of the cumulative share $\Phi_I$ of bundle I is equal to the sum of the service shares of the data packet flows of bundle I that are backlogged.

13. The scheduling apparatus of claim 12, wherein the value of the cumulative share $\Phi_I$ of bundle us set when a first data packet flow of the bundle is first serviced in a service frame, and kept unchanged for the whole duration of the same service frame, even if the backlog state of one or a plurality of data packet flows of bundle I changes during the service frame.

14. The scheduling apparatus of claim 13, wherein a running share $\phi_I$ maintains the sum of the service shares of the data packet flows that are backlogged in bundle I, and changes when the backlog state of one or a plurality of data packet flows in the bundle changes, the value of said running share $\phi_I$ being used to set the value of said cumulative share $\Phi_I$ when required.

15. The scheduling apparatus of claim 13, wherein said first service to said first data packet flow of bundle I is detected when the start flag $\sigma_I$ of the bundle I that includes the next flow i to be processed has different value than the global frame counter FRMCNT.

16. A method for scheduling the transmission of data packets for a plurality of data packet flows, said data packet flows being allocated service shares of the transmission capacity of an outgoing communication link and being grouped in a plurality of bundles, said bundles being allocated service shares $R_I$ of the transmission capacity r of said outgoing communication link, the transmission over the communication link being divided in service frames, a service frame offering at least one transmission opportunity to every data packet flow that is backlogged, a backlogged data packet flow being a data packet flow that has at least one data packet stored in respective one of a plurality of packet queues, the method comprising the steps of:

determining the duration of the service frame;

guaranteeing that each data packet flow always receives at least its is allocated service share during a service frame if it remains continuously backlogged over the whole duration of said service frame, and that each bundle receives at least its allocated service share during a service frame if there is always at least one data packet flow in the bundle that remains continuously backlogged for the whole duration of said service frame;

maintaining, for each bundle I, a cumulative share $\Phi_I$ that relates to the sum of said service shares allocated to respective ones of said data packet flows that are grouped together in the same bundle I;

computing, for each bundle I, a service ratio between the service share allocated to said bundle I and said cumulative share $\Phi_I$ of the bundle; and modulating said service shares allocated to respective ones of said plurality of data packet flows using the service ratio computed for respective ones of said plurality of bundles.

* * * * *